May 12, 1925.
S. DONNER
1,537,659
BLOCKER FOR GROWING VEGETATION
Filed April 20, 1922    2 Sheets-Sheet 1
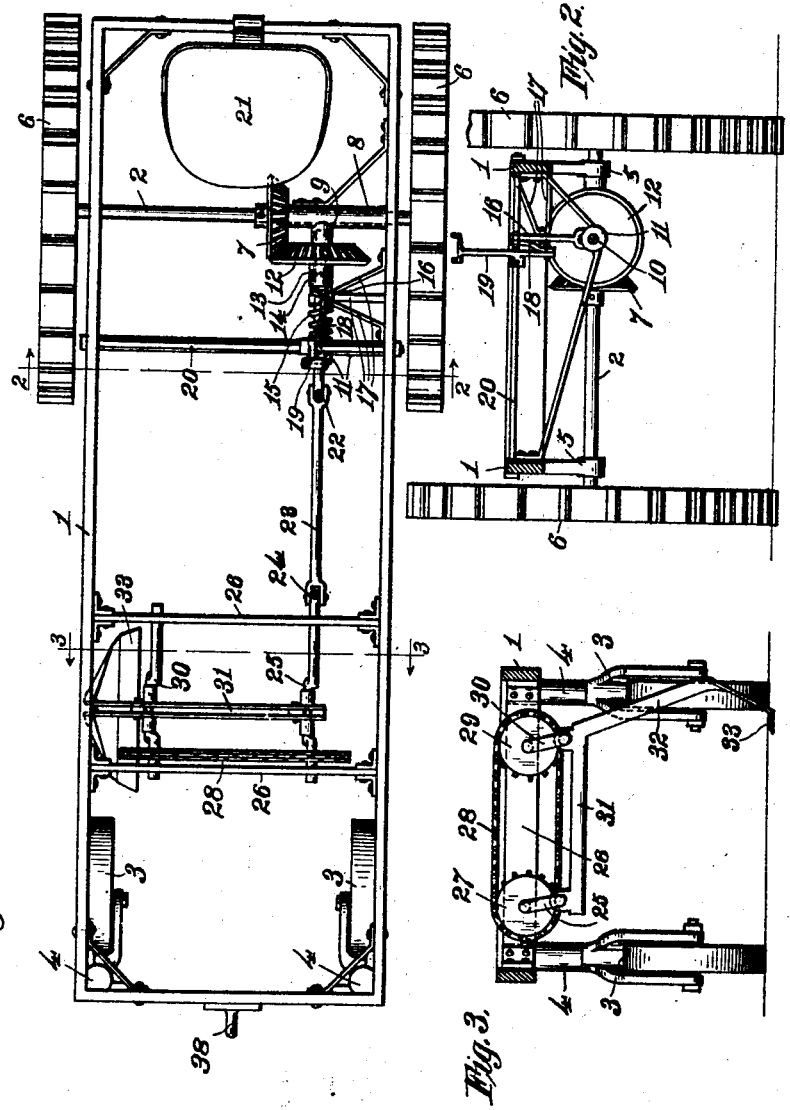
Inventor
Stephen Donner
By Edgar M Kitchin,
his Attorney

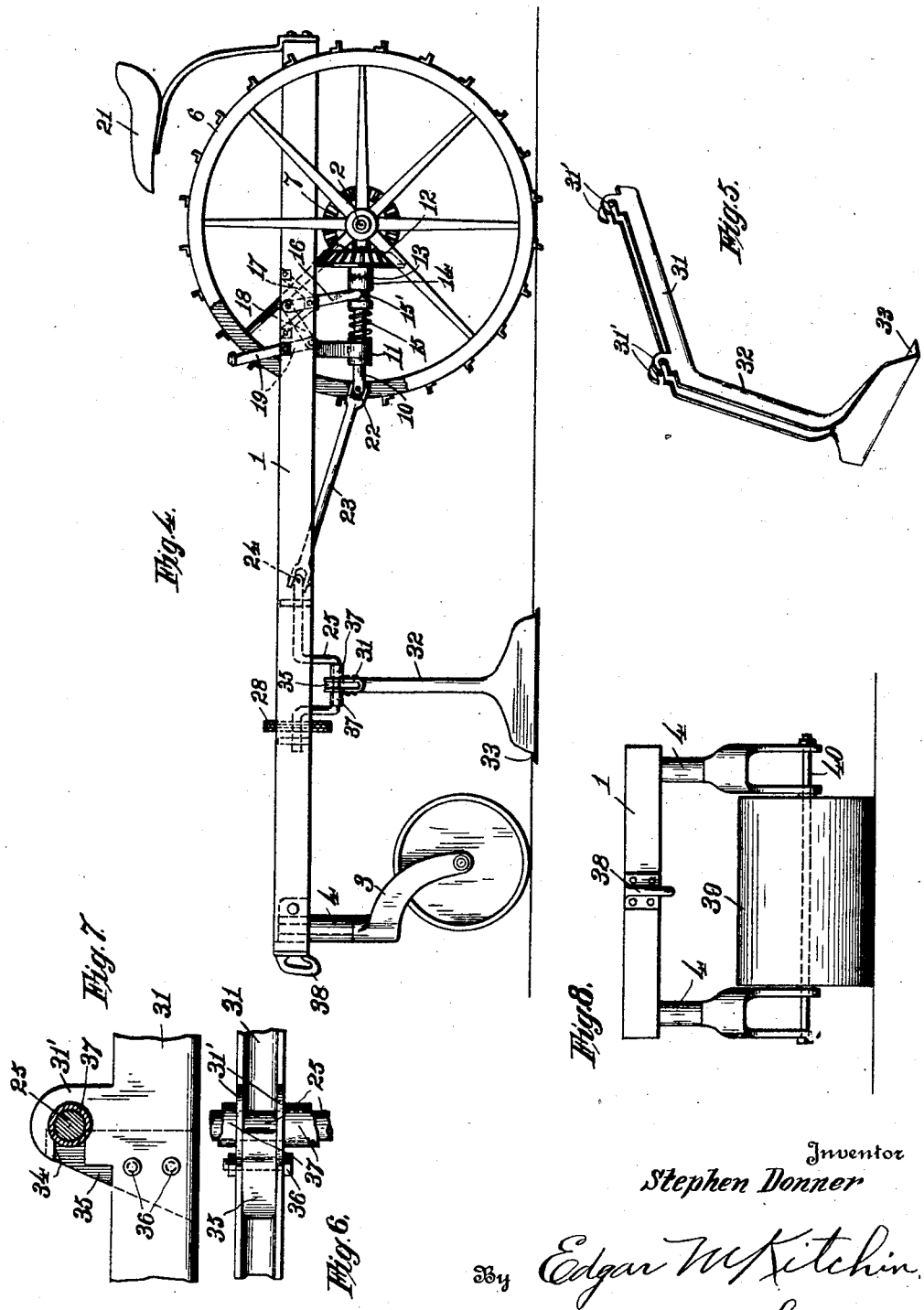

Patented May 12, 1925.

1,537,659

UNITED STATES PATENT OFFICE.

STEPHEN DONNER, OF TOLEDO, OHIO, ASSIGNOR OF ONE-HALF TO JOHN M. GOULD, OF HASTINGS, MICHIGAN.

BLOCKER FOR GROWING VEGETATION.

Application filed April 20, 1922. Serial No. 555,787.

*To all whom it may concern:*

Be it known that I, STEPHEN DONNER, a citizen of the United States, residing at Toledo, in the county of Lucas and State of Ohio, have invented certain new and useful Improvements in Blockers for Growing Vegetation; and I do hereby declare the following to be a full, clear, and exact description of the invention, such as will enable others skilled in the art to which it appertains to make and use the same.

This invention relates to improvements in machines for cutting away excess vegetation, as, for instance, the chopping of beets or the blocking of cotton, for encouraging development of the remaining vegetation.

An object in view is the effective and successive cutting by an instrument moved along such lines as to cause the cutting edge to have substantially a horizontal cutting stroke whereby is obviated the jar to the mechanism which occurs in apparatus employing hoe-like strokes.

A further object in view is the actuation of the cutting mechanism from one of the carrier wheels by power-transmitting apparatus susceptible of ready and easy control from a point adjacent the driving carrier wheel.

With this and further objects in view, the invention comprises certain novel constructions, combinations, and arrangements of parts, as will hereinafter become apparent and be subsequently pointed out in the claims.

In the accompanying drawings,—

Figure 1 is a plan view of an apparatus embodying the features of the present invention.

Figure 2 is a transverse, vertical section taken on the plane indicated by line 2—2 of Figure 1, and looking rearward; the carrier wheels being seen in elevation, and a fragment of one of the carrier wheels being broken away.

Figure 3 is a similar view of the same taken on the plane indicated by line 3—3 of Figure 1, and looking forward, parts being seen in elevation.

Figure 4 is a view in side elevation, part of one of the carrier wheels being broken away to disclose otherwise concealed parts.

Figure 5 is an enlarged, detail prospective view of the cutting implement detached.

Figures 6 and 7 are enlarged, detail, fragmentary views showing the detachable connection for the pitman to the cranks.

Figure 8 is a front elevation of a slightly modified embodiment.

Referring to the drawings by numerals, 1 indicates a rectangular frame of wood, metal, or other appropriate material, braced and stiffened in any appropriate or preferred manner, and mounted at the rear on an axle 2 and at the front on casters 3, 3. The shanks of the casters find bearings in vertically disposed sleeves 4, 4, affixed to the frame 1.

The axle 2 extends through and is journaled in appropriate journal boxes 5, 5, dependent from and forming a part of the frame 1. Supporting the axle 2, are carrier wheels 6, 6, arranged at the ends of the axle, one of the wheels being journaled on the axle and the other keyed thereto in the usual form. A bevel-gear 7 is fixed to the axle 2, as by being secured thereto by the employment of a locking set screw passed through an outstanding collar or boss on the gear. A sleeve 8 surrounds the shaft 2 and extends from the gear 7 to the adjacent portion of frame 1. Sleeve 8 is provided with a laterally extending bearing collar 9, in which is journaled the rear end of a shaft 10, the forward portion of shaft 10 being journaled in a bracket 11. The bracket 11 consists of arms fixed to and extending from the side bars of frame 1 and terminating in a sleeve bearing for the shaft 10. A bevel-gear 12 is journaled on shaft 10 and meshes with gear 7 so as to revolve continuously as the carrier wheels 6 revolve. Gear 12 is provided with a forwardly extending sleeve or boss formed with a clutch face 13 adapted to cooperate with a clutch member 14 slidingly mounted on the shaft 10. The clutch member 14 is pressed by a coil spring 15 which surrounds the shaft 10 and is interposed between the bracket 11 and clutch member 14 for constantly stressing the clutch member to a clutching position with respect to the clutch face of sleeve 13. Clutch member 14 is provided with the usual annular groove 15′ engaged by the fork of an operating arm 16. The arm 16 is pivoted to a bracket 17 extending laterally from one of the side bars of the frame 2, and the upper end portion of lever 16, beyond the pivot, is pivotally engaged by a link 18, which link is inclined downward and forward and pivoted to the lower end of an operating lever 19. Lever 19 is pivoted on a cross rod 20 connecting the side beams of frame 1. Lever 19 extends forward from the point of its pivot to an appropriate location with respect to a saddle or other seat 21 carried by frame 1 for facilitating manipulation by the foot of the occupant of said saddle. Of course it will be obvious that lever 19 may be lengthened or otherwise formed to facilitate manual manipulation if desired.

The forward end of shaft 10 is connected by a universal joint 22 with a drive shaft 23 which extends on an incline forward and upward for causing its forward end portion to lie within the horizontal planes of frame 1. The forward end portion of shaft 23 is connected by universal joint 24 with the extended journal of a crank 25. A pair of cross beams or transoms 26 is arranged within frame 1 with the ends of the transoms fixed to the respective side beams of the frame 1. The transoms 26 are spaced apart sufficiently for accommodating the operating parts hereafter mentioned between them. The journal end portions of crank 25 extend through and find bearings in the transoms 26. Fixed to and carried by one of such journal end portions is a sprocket wheel 27, about which is passed an endless sprocket chain 28, which chain is also passed about a sprocket 29 corresponding in structure and location with sprocket 25, but adjacent the opposite side of frame 1. The sprocket 29 is fixed to one of the journaled end portions of a crank 30, which crank has end portions extending through and journaled in the transoms 26. Thus the crank 30 will move synchronously with crank 25, and the wrist pins of said cranks are connected by a link or pitman 31. Extending downward and preferably at a slight incline from and fixed to the link 31 is a bar or handle 32 for the knife or cutting instrument 33, the edge portion of which cutting instrument is turned so as to lie continually in substantially a horizontal position, as clearly seen in Figure 3. As a convenient and inexpensive method of manufacture, I preferably construct the cutting instrument 33 with its handle 32 and the link or pitman 31 of a single sheet of material stamped or otherwise shaped to form the completed parts. The bar or handle 32 and link or pitman 31, when the parts are made of sheet material, are formed as channel bars, and the link or pitman 31 has its side flanges provided near each terminus with upstanding perforated ears 31'. The ears 31' receive the wrist pins of cranks 25 and 30. The method of assemblage of the ears and crank wrist pins is susceptible of considerable variation, but I prefer to render the cutting instrument easily and quickly detachable by providing slots 34 in the ears 31' leading from the openings in the ears to the exterior thereof in the direction away from the direction of stress of the cranks on the ears during a cutting stroke of the cutting instrument. Each pair of ears is provided with a block 35 arranged between the ears and between the side flanges of the link or pitman 31 for forming the equivalent of enclosures for the slots 34. The blocks 35 are connected as by bolts or cotter pins 36 passed through the said side flanges and ears and through the blocks 35. Withdrawal of the bolts or pins 36 enables withdrawal of the blocks, whereby the pitman may be moved away from the cranks, and replacements and repairs are thus rendered possible with expedition and ease. Since it is desirable not to have the sides of the link or pitman 31 rub against or frictionally engage the radial arms of the cranks, the cranks are made sufficiently wide to allow ample space, and the pitman 31 is preferably maintained centered on the crank wrist pins by centering sleeves 37—37 mounted on said wrist pins between the respective sides of the pitman 31 and the radial arms of the cranks.

In operation, the draft apparatus is connected through a clevis hook 38 fixed to the front end of frame 1, and the operator, being seated on saddle 21, moves the clutch sleeve 14 out of clutch when the cutting instrument is in a rest position, and retains the parts in this position until the apparatus is in the desired location with respect to the row of cotton or beets or other vegetation. He then removes his foot from the lever 19, allows power to be delivered through the gears 7 and 12 and shafts 10 and 23 to the cranks 25 and 30. The cutting instrument is thereby actuated and moved in a curved path with the cutting edge portion disposed approximately horizontally during the cutting stroke. A cutting stroke will occur once with each revolution of the cranks, and the relative distance apart of the cuts will be controlled by the ratio of the gear 7 to gear 12 and also by the ratio of those gears to the carrying wheels. With the gearing possessing the ratio substantially as shown, there would be one cutting stroke of the cutting instrument for approximately each one and one-third revolutions of the carrying wheels. The number of cutting strokes in a given distance may be increased by replacing the gear 12 with a smaller gear and the gear 7 with a larger one, and the distance apart of the strokes of the cutting instrument may be increased by the substitution of a larger gear for gear 12 and a smaller gear for gear 7; but any change in the gears 7 and 12 would necessitate changes in the length and proportions of cooperating parts.

In Figure 8 is seen frame 1 with the sleeves 4 and the forks of the casters. In the structure seen in 8, however, the caster wheels have been removed, and a roller 39 has been substituted, being introduced between the adjacent arms of the respective forks and retained by a cross rod 40, passed through the forks and through the roller 39 along its axis. The structure when so arranged is adapted to serve for rolling purposes in addition to the cutting out of sections of vegetation. It is obvious, of course, that steering with the structure shown in Figure 8 would be more difficult than with the casters, since somewhat of a dragging action must occur in going around curves.

What is claimed is:—

1. In vegetation cutting apparatus, a cutting instrument comprising a channel bar pitman having perforated ears adapted to engage wrist pins of actuating cranks, each of the ears being formed with a slot extending from its perforation to its exterior for enabling application and removal of the ears to and from the wrist pins, blocks detachably connected to and within the channel of the pitman for closing said slots, and cutting means carried by the pitman.

2. In vegetation cutting apparatus, a cutting instrument comprising a channel bar pitman having a recess for receiving an actuator, means engaging the channel for removably closing the recess for retaining the pitman in engagement with the actuator, and cutting means carried by the pitman.

3. In vegetation cutting apparatus, a cutting instrument comprising a channel bar pitman having a recess for receiving an actuator, a block within the channel for removably closing the recess for retaining the pitman in engagement with the actuator, and cutting means carried by the pitman.

4. In vegetation cutting apparatus, a cutting instrument comprising a channel bar pitman having recesses for receiving actuators, means engaging the channel bar for removably closing said recesses for retaining the pitman in engagement with the actuators, and cutting means carried by the pitman.

5. In vegetation cutting apparatus, the combination, with a frame and carrier wheels therefor, of spaced cranks sustained by the frame, means for synchronously rotating the cranks, and a channel bar pitman having perforated ears engaging the wrist pins of the cranks, each of the ears being formed with a slot extending from its perforation to its exterior for enabling application and removal of the ears to and from the wrist pins, blocks detachably connected to and within the channel of the pitman for closing said slots, and cutting means sustained and actuated by the pitman.

In testimony whereof I affix my signature in presence of two witnesses.

STEPHEN DONNER.

Witnesses:
VERMONT WALTERS,
WM. GRANT.